May 14, 1963  J. W. COFFMAN ETAL  3,089,802
METHOD OF MAKING POLARIZED SLIDES
Filed Feb. 1, 1960  2 Sheets-Sheet 1
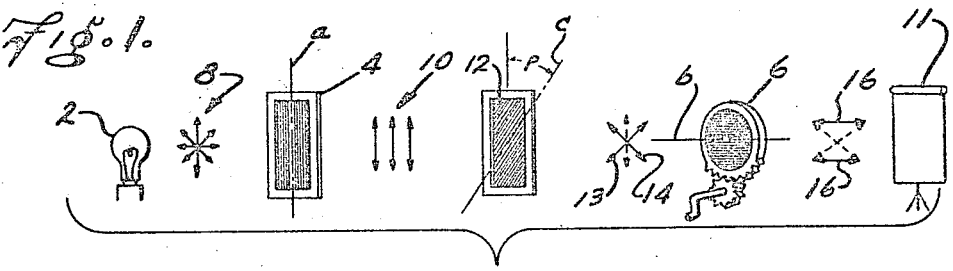
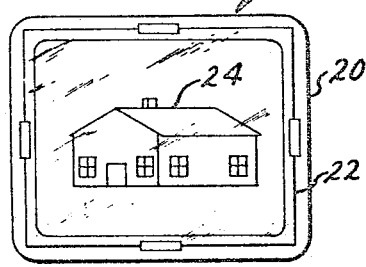
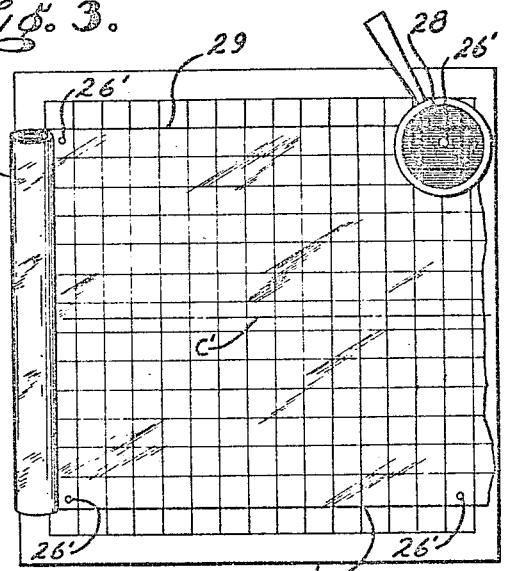
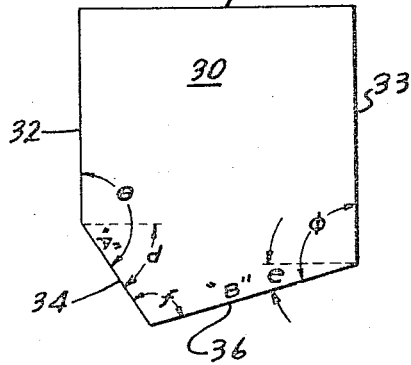
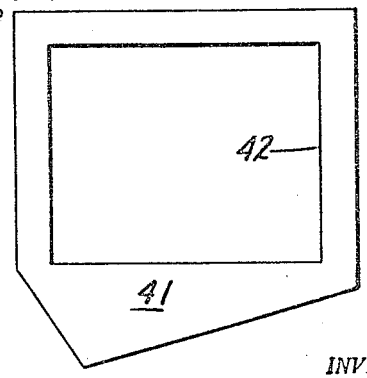
INVENTORS
JOE W. COFFMAN
ROBERT F. BELIVEAU
BY Chapin & Neal
ATTORNEYS

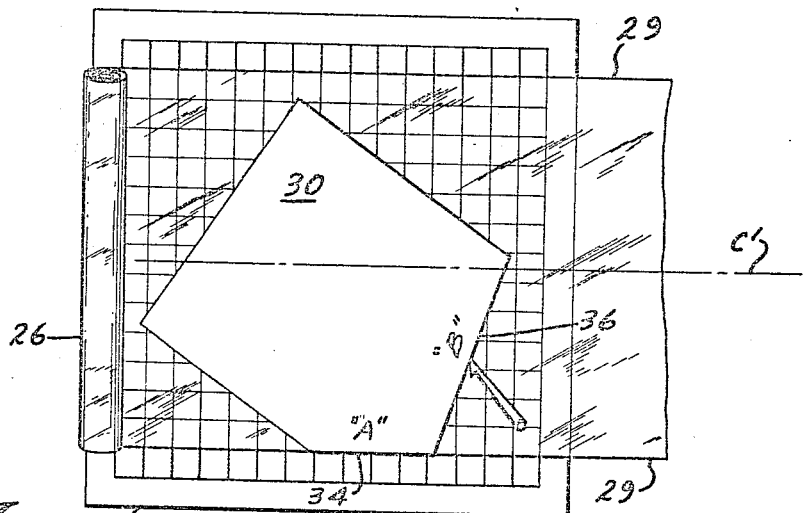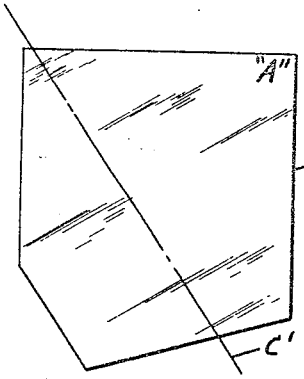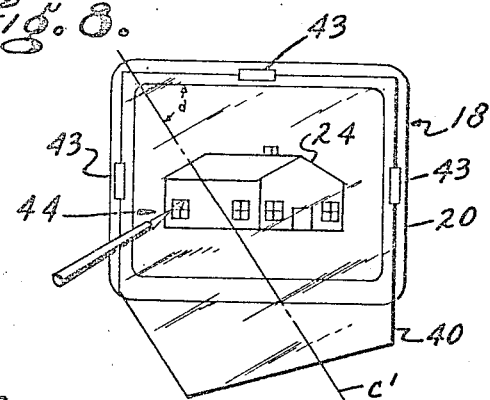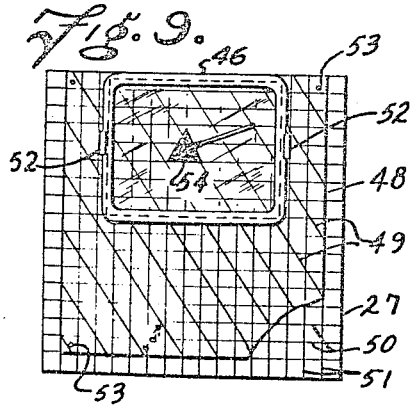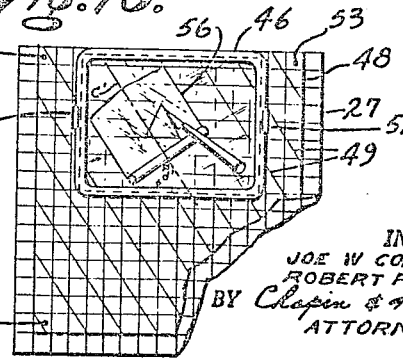

3,089,802
METHOD OF MAKING POLARIZED SLIDES
Joe W. Coffman, Holyoke, and Robert F. Beliveau, Easthampton, Mass., assignors to Tecnifax Corporation, Holyoke, Mass., a corporation of Massachusetts
Filed Feb. 1, 1960, Ser. No. 5,885
1 Claim. (Cl. 156—108)

This invention relates to methods and means for utilizing the characteristic properties of polarized light for special visual effects in optical projection.

Polarization for projection involves the use of a polarizing filter and an analyzing filter to pass or block selectively varying and spectrally diverse elements of the light which would normally reach the viewing screen. When a polarizing filter is placed on the stage of an "overhead" projector, or to the rear of the projection aperture in other types of slide projectors, and a rotatable analyzing filter is placed between the polarizing filter and the projection objective, many dramatic visual effects can be created on the screen. When a beam of light is passed through the polarizing filter the light transmitted is plane-polarized. When the polarization axis of the analyzer is parallel to that of the analyzing filter, the polarized light passes relatively unaffected through the analyzer. Rotation of the analyzer reduces the amount of light transmitted. When the planes of polarization of the polarizing and analyzing filters are at right angles to each other, practically no light is transmitted to the viewing screen.

If certain transparent materials which have been subjected to certain types of stress are placed between the polarizer and analyzer, they tend to interfere with the normal polarization effects by refracting the plane-polarized light. Many normally transparent materials become doubly refractive when mechanically stressed. When the axis of stress of such a material is placed at an angle to the plane-polarized light, the light is resolved into two components; one in the plane of the optical axis, called the "ordinary ray"; and the other at right angles thereto, called the "extraordinary ray." The extent of interference or refraction depends upon the material used, its thickness, and the angle at which the stress lines are oriented relative to the polarizing and analyzing filters. Thus, it has been found that if the analyzer is rotated to an angle at which the projected polarized light is blocked from the screen and a strip of transparent stress material, such as cellophane, is placed at the requisite angle between the polarizer and analyzer, the area covered by the cellophane will transmit light to the viewing screen, while the remaining area will remain darkened. Subsequent rotation of the analyzer will gradually darken the area covered by the cellophane, and lighten the remaining area. When transparent stressed materials are placed on a slide transparency, with their polarizing axes at various angles, and the analyzer is then rotated, dramatic effects of highlighting, fading and "ghosting" can be achieved.

A troublesome aspect of preparing polarizing slides is the orientation of the optical axes of stressed materials at the requisite angles relative to the polarizer to achieve maximum interference with the plane-polarized light passed by the polarizer.

It is the principal object of this invention to provide improved methods of orienting transparent stressed materials on slide transparencies to achieve desired polarization effects.

It is another object of this invention to provide a device which facilitates the preparation of polarization-effect slides, and insures uniformity in the results obtained.

The above and other objects and advantages of this invention will be apparent from the following description, and with reference to the accompanying drawings, in which:

FIG. 1 is a diagrammatic view of one type of slide projector equipped for exhibiting polarization-effect slides;

FIG. 2 is a view of one type of slide transparency which may be used in practicing this invention and which is capable of being used in an "overhead" type projector;

FIG. 3 shows a step in the method at making polarization-effect slides embodying this invention;

FIG. 4 is a view of a template embodying this invention;

FIG. 5 shows a modified form of template embodying the invention;

FIGS. 6–8 show some of the steps involved in the method of making polarization-effect slides for the "overhead" type of slide projector; and FIGS. 9–10 show some of the steps of an alternative method of making similar slides.

Referring in detail to the drawings, a polarizing projector is indicated diagrammatically in FIG. 1. The projector comprises a source of illumination 2, a polarizing filter 4, and a rotatable analyzing filter 6. The light wave radiation emitted by the source of illumination is omnidirectional transversely of its direction of propagation as indicated by the arrows 8. The optical axis $a$ of the polarizing filter may be oriented in a given direction, such as that shown in the drawings. The light passing through the polarizing filter is plane-polarized, as indicated by arrows 10. If the optical axis $b$ of the analyzing filter 6 is oriented at right angles to the axis $a$ of the polarizing filter, little or no light will be projected on the screen 11. Disposed between the polarizer and analyzer is a doubly-refractive stressed transparent material 12. This material has an optical axis $c$ shown disposed at an oblique polarizing angle $p$ to the axis of the filter. The plane-polarized light transmitted by the stressed material 12 is resolved into ordinary and extraordinary rays 13 and 14 respectively. In effect the material 12 annuls the plane-polarized light by interference. The components 13 and 14 traverse the material 12 with different velocities, and in general emerge displaced from each other in phase. The issuing light is said to be elliptically polarized. As shown in FIG. 1, the horizontal components 16 of the ordinary and extraordinary rays will be passed by the analyzer 6 and the screen 11 will be illuminated. It will thus be appreciated that by placing a doubly-refractive stressed transparent material on a slide transparency, and positioning the transparency at a requisite angle between the polarizer and the analyzer, numerous visual effects can be achieved by rotating the analyzer.

In FIG. 2 a slide transparency is indicated generally at 18, and comprises a frame 20, on which is mounted an unstressed transparent material 22 bearing an image 24. Placing this transparency between the polarizer and the analyzer of FIG. 1, will produce no effect on the plane-polarized light transmitted by the polarizer. Consequently, when the analyzer is rotated, all the light projected on the screen 11 will be varied, providing no variation for specific portions of the slide. Employing the technique of this invention, a doubly-refractive or birefrangible stressed transparent material is placed on selected portions of the image, with the optical axis of the material oriented at a suitable oblique angle to the axis of the filter. This oblique angle is a function of the refractive indices of the stressed material being used.

In carrying out this invention, a web 26 of stressed material, such as cellophane, is placed on a flat underlying surface and affixed thereto by any suitable means such as pins 26', tape, or the like. A rectangular grid 27 may be placed beneath the cellophane, in which case the sides edges 29 of the web would be aligned parallel to the horizontal lines of the grid. As indicated by the magnified portion of the web, the stressed cellophane has a number of longitudinally disposed stress lines 28 which run parallel to the side edges 29 of the web. The cellophane has an optical axis $c'$ which is parallel to its side edges 29.

In order to orient the optical axis $c'$ of the stressed material at a suitable oblique angle to the axis of the polarizing filter, a polygonal portion of cellophane is cut from the web on a bias to the stress lines of the material. This is accomplished by the use of a template 30, shown in FIG. 4, which defines the polygonal area of the material to be cut. The template includes rectangularly disposed edges 31, 32 and 33 and obliquely disposed edges 34 and 36 which are disposed at obtuse angles to the sides 32 and 33 respectively. The rectangularly disposed edges define a rectangular area which is larger than the opening of the slide frame on which the cellophane is to be mounted, and smaller than the area defined by the outer edges of the frame. The sides 32 and 34 define an obtuse angle $\theta$ and the sides 33 and 36 define an obtuse angle $\phi$. An acute angle $d = \theta - 90°$ and angle $e = \phi - 90°$, angles $d$ and $e$ being the extent of obliquity of the obtuse angles $\theta$ and $\phi$ respectively. The obliquely disposed edges 34 and 36 of the template intersect forming an obtuse angle $f$ which is the supplementary angle $d+e$. Angle $d$ is approximately equal to the polarizing angle $p$, FIG. 1, at which the optical axis of the stressed material should be placed, relative to the filter axis, for substantially maximum interference with plane-polarized light. Angle $d$ is a function of the refractive index of the stressed material used. Angle $e$ is approximately equal to another polarizing angle at which the optical axis of the stress material may be oriented relative to the polarization axis. It has been found that substantially maximum interference effects are achieved for various types of stressed celophane when the angle $d$ is not substantially less than 40° nor greater than 55°, preferably being 45°. Similarly, when the angle $e$ is not less than 10° nor greater than 25°, preferably 15°, interference effects approaching the maximum are also achieved.

In preparing a polarization-effect slide, the template 30 is placed in overlying relation on the web 26, as shown in FIG. 6, with either the edge 34 or the edge 36 aligned parallel to one of the side edges 29 of the web; or, if desired, to one of the horizontal lines of the grid 27. The area of the stressed material underlying the template is cut from the web forming a cutout 40 (FIG. 7) having the same shape as the template. One corner of the cutout may be marked with a suitable index mark such as the "A" shown in FIG. 6, to facilitate registration of the cutout on the frame of a slide and to provide a reference as to which oblique edge of the template was used in making the cutout. For this reason it may also be desirable to mark the oblique edges 34 and 36 of the template with suitable indicia such as indicated by the letters "A" and "B" in FIGS. 4 and 6.

In FIG. 5 is shown a modified form of template 41 also embodying this invention. The template 41 is similar to the one shown in FIG. 4, but includes a rectangular opening 42, the dimensions of which are slightly smaller than the outside dimensions of the slide frames on which the stressed material is to be mounted. The template 41 is used in a manner similar to that for template 30, except that the stressed material is cut along the edges of the rectangular opening 42.

After the cutout 40 has been made, it is secured to the frame of the slide transparency 18, as shown in FIG. 8. The slide transparency is preferably placed face down, and the rectangular edges of the cutout are registered parallel to the corresponding edges of the frame 20. The cutout is then secured to the frame by suitable means, such as tape 43. If the template 30 is used to make the cutout, the portion of the cutout which extends beyond the edges of the frame is trimmed off. However, if the template 41 is used the cutout formed would fit perfectly on the frame, and no trimming would be necessary. As shown in FIG. 8, when the cutout is secured to the frame as described, the optical axis $c'$ of the stressed material is disposed at the oblique angle $d$ to the horizontal edges of the frame. If the edge 36 of the template had been used to form the cutout, the axis $c'$ of the stressed material would be disposed at the oblique angle $e$ of the horizontal edges of the frame.

At this point in the process, the entire frame opening is covered by the stressed material. In order to achieve contrasting light effects for selected areas of the slide, portions of the stressed material are cut out, as indicated at 44 in FIG. 8. Thus, if the bi-refrangible material overlying the windows of the house image 24 be removed, several varying projection effects can be achieved. After the selected portions of the stressed material have been removed, the slide is ready for use.

The completed slide is placed between the polarizing and analyzing filters of a projector, with the edges of the frame 20 registered with the corresponding edges of the filter frame. Rotation of the projector analyzer will produce differing lighting effects in the windows, and the remainder of the image 24. For example, the windows may be brightly illuminated, or highlighted, at the same time that the remainder of the slide is darkened or subdued. Also, the windows may be darkened while the remainder of the slide is highlighted. The angular position of the analyzer which provides the desired projection effect may be recorded on the slide frame, for future use by any projector operator.

If it is desired to laminate selected small areas of a transparency with a polarizing material, an alternative method may be used for cutting and affixing the material at the desired angle on the slide. As shown in FIG. 9, a rectangularly shaped grid 48 is provided, having a plurality of parallel diagonal lines 49 disposed at an oblique angle $d'$ to the lower edge of the grid. The edges of the grid 48 are registered parallel to the horizontal and vertical lines of an underlying rectangular grid 27. A slide transparency 46 is placed on top of the grid 48 and its edges are aligned parallel to the horizontal and vertical lines 50 and 51 respectively of the lower rectangular grid 27. The grids 27 and 48 and the slide 46 are secured in this registered relation by some suitable means such as tape 52 and pins 53. The areas of the slide to which the polarizing material is to be laminated are then coated with a transparent adhesive material 54, such as liquid rubber cement. If desirable, the underlying rectangular grid may be used as a guide in coating in a desired pattern a selected area of the slide transparency of the adhesive material. Thereafter a web 56 of stressed doubly-refrangible material, such as cellophane, is unrolled on top of the slide. The side edges of the web are registered parallel to certain of the diagonal lines 49 of the grid 48, depending on the areas to be laminated. The cellophane overlying the adhesive-coated area is burnished until it firmly adheres to the transparency. The web is then cut in the desired pattern and removed from around the coated area. The alternative method provides a slide transparency having selected areas which are laminated with stressed material. The optical axis $c'$ of the cellophane web 56 is oriented at the desired oblique angle $d'$ to the edges of the slide 46. In carrying out this alternative method a relatively narrow web of stressed material may be used, reducing the cost of preparing polarization-effect slides. Furthermore, a number of grids similar to the one indicated at 48 may be provided, having diagonal grid lines disposed at different angles for laminating stressed material on a slide, at various locations and polarization angles.

Having thus described this invention what is claimed is:

Method of orienting on slide transparencies portions of a web of longitudinally stressed transparent material having an optical axis parallel to the side edges of said web for producing substantially maximum interference effects on plane-polarized light propagated normal to the plane of said slide; said method comprising: superimposing on said web a template of polygonal configuration defined by rectangularly disposed edges, and at least one obliquely disposed edge, aligning the obliquely disposed edge of said template parallel to a side edge of said web, cutting the underlying stressed material along the rectangularly disposed edges of said template, registering the rectangularly disposed edges of the cutout parallel to corresponding edges of a slide frame, securing the cutout to the frame and removing one or more selected portions of the cutout disposed within said frame.

References Cited in the file of this patent

UNITED STATES PATENTS

| | | |
|---|---|---|
| 411,617 | Rondinella | Sept. 24, 1889 |
| 614,175 | Maurer | Nov. 15, 1898 |
| 2,293,696 | Burchel | Aug. 25, 1942 |
| 2,294,159 | Calabro | Aug. 25, 1942 |
| 2,393,968 | Burchel et al. | Feb. 5, 1946 |
| 2,511,303 | Stevens et al. | June 13, 1950 |
| 2,559,434 | Hyland | July 3, 1951 |
| 2,587,022 | Langan | Feb. 26, 1952 |
| 2,591,519 | Decker | Apr. 1, 1952 |
| 2,713,205 | Nielsen | July 19, 1955 |
| 2,713,724 | Sanchez | July 26, 1955 |
| 2,820,294 | Dolgorukov | Jan. 21, 1958 |